(12) United States Patent
Wouters et al.

(10) Patent No.: US 7,955,414 B2
(45) Date of Patent: Jun. 7, 2011

(54) METHOD AND DEVICE FOR METAL PURIFICATION AND SEPARATION OF PURIFIED METAL FROM METAL MOTHER LIQUID SUCH AS ALUMINIUM

(75) Inventors: Huibrecht Adriaan Wouters, Leiden (NL); Andreas Ten Cate, Amsterdam (NL); Elisabeth Maria Beunder, Alkmaar (NL); Willem Boender, Ridderkerk (NL); Marcellus Albertus Hogenboom, Oude Wetering (NL); René Kieft, Beverwijk (NL); Joost Christiaan Storm, Akersloot (NL)

(73) Assignee: Aleris Switzerland GmbH, Schaffhausen (CH)

( * ) Notice: Subject to any disclaimer, the term of this patent is extended or adjusted under 35 U.S.C. 154(b) by 45 days.

(21) Appl. No.: 12/306,023

(22) PCT Filed: Jul. 5, 2007

(86) PCT No.: PCT/EP2007/005974
§ 371 (c)(1),
(2), (4) Date: Jul. 6, 2009

(87) PCT Pub. No.: WO2008/003505
PCT Pub. Date: Jan. 10, 2008

(65) Prior Publication Data
US 2009/0308203 A1 Dec. 17, 2009

(30) Foreign Application Priority Data
Jul. 7, 2006 (EP) .................................. 06014125

(51) Int. Cl.
*C22B 9/10* (2006.01)

(52) U.S. Cl. ........................ 75/584; 75/679; 164/134
(58) Field of Classification Search .................. 75/588, 75/679; 164/134
See application file for complete search history.

(56) References Cited

U.S. PATENT DOCUMENTS
1,562,090 A 11/1925 Hoopes
(Continued)

FOREIGN PATENT DOCUMENTS
DE 258 283 A1 7/1988
(Continued)

OTHER PUBLICATIONS
Davis, J.R. (editor), ASM Specialty Handbook, Aluminum and Aluminum Alloys, pp. 207-216 (1993).
(Continued)

*Primary Examiner* — George Wyszomierski
*Assistant Examiner* — Tima M McGuthry-Banks
(74) *Attorney, Agent, or Firm* — Novak Druce + Quigg

(57) ABSTRACT

A method and device for the purification and separation of purified metal from a metal mother liquid having a specific density and comprising one or more foreign element(s). The method includes: providing in a column device a starting material including metal crystals and a metal mother liquid including at least one foreign element; applying a temperature difference between a relatively hot zone at the upper end of the column and a relatively cool zone at the lower end of the column; a separation step wherein at least a part of the metal crystals is separated from the metal mother liquid by rising of the metal crystals to the upper surface of the metal mother liquid; and a further separation step wherein purified metal floating on the upper surface of the metal mother liquid is discharged from the column device.

20 Claims, 1 Drawing Sheet

U.S. PATENT DOCUMENTS

| | | | |
|---|---|---|---|
| 1,938,101 A | 12/1933 | Hall | |
| 3,211,547 A | 10/1965 | Jarrett et al. | |
| 3,239,899 A * | 3/1966 | Johnson | 164/80 |
| 3,296,811 A | 1/1967 | Stoller | |
| 3,303,019 A | 2/1967 | Jacobs | |
| 3,308,666 A | 3/1967 | Anderson et al. | |
| 3,671,229 A | 6/1972 | Ferber et al. | |
| 3,839,019 A | 10/1974 | Bruno et al. | |
| 3,840,219 A | 10/1974 | Sheridan et al. | |
| 3,840,364 A | 10/1974 | Flemings et al. | |
| 3,849,119 A | 11/1974 | Bruno et al. | |
| 4,043,802 A | 8/1977 | Esdaile et al. | |
| 4,050,683 A | 9/1977 | Langhammer | |
| 4,099,965 A | 7/1978 | Beguin et al. | |
| 4,133,517 A | 1/1979 | Esdaile et al. | |
| 4,222,830 A | 9/1980 | Dawless et al. | |
| 4,239,606 A | 12/1980 | Dawless et al. | |
| 4,243,211 A | 1/1981 | Leroy et al. | |
| 4,273,627 A | 6/1981 | Dawless et al. | |
| 4,305,763 A | 12/1981 | Quist et al. | |
| 4,379,718 A | 4/1983 | Grantham et al. | |
| 4,411,747 A | 10/1983 | Dawless et al. | |
| 4,456,480 A | 6/1984 | Wintenberger | |
| 4,581,062 A | 4/1986 | Boutin | |
| 4,736,314 A | 4/1988 | Riese et al. | |
| 4,744,823 A | 5/1988 | Raymond-Seraille | |
| 4,781,771 A | 11/1988 | Masumoto et al. | |
| 5,057,150 A | 10/1991 | Reeve et al. | |
| 5,160,532 A | 11/1992 | Benz et al. | |
| 5,221,377 A | 6/1993 | Hunt, Jr. et al. | |
| 5,312,498 A | 5/1994 | Anderson | |
| 5,405,427 A | 4/1995 | Eckert | |
| 5,427,602 A | 6/1995 | DeYoung et al. | |
| 5,573,574 A | 11/1996 | Leroy | |
| 5,741,348 A | 4/1998 | Van Der Donk et al. | |
| 5,968,223 A | 10/1999 | Eckert | |
| 6,143,070 A | 11/2000 | Bliss et al. | |
| 6,224,648 B1 | 5/2001 | Verdoes et al. | |
| 6,290,900 B1 | 9/2001 | Hatano et al. | |
| 6,355,085 B1 | 3/2002 | Pillin | |
| 6,482,386 B2 | 11/2002 | Atchetee et al. | |
| 6,909,505 B2 | 6/2005 | Lucas et al. | |
| 6,972,110 B2 | 12/2005 | Chakrabarti et al. | |
| 7,419,530 B2 | 9/2008 | De Vries et al. | |
| 7,442,228 B2 | 10/2008 | De Vries | |
| 7,531,023 B2 | 5/2009 | De Vries | |
| 7,537,639 B2 | 5/2009 | De Vries | |
| 7,648,559 B2 | 1/2010 | De Vries et al. | |
| 2004/0261572 A1 | 12/2004 | De Vries | |
| 2005/0145071 A1 | 7/2005 | Cates | |
| 2007/0023110 A1 | 2/2007 | De Vries | |
| 2009/0301259 A1 | 12/2009 | De Vries et al. | |
| 2010/0024602 A1 | 2/2010 | Wouters et al. | |

FOREIGN PATENT DOCUMENTS

| | | |
|---|---|---|
| DE | 43 25 793 A1 | 2/1995 |
| EP | 0099948 A1 | 2/1984 |
| EP | 0375308 A1 | 6/1990 |
| EP | 0587274 A1 | 3/1994 |
| EP | 0696646 A2 | 2/1996 |
| EP | 0745693 A1 | 12/1996 |
| EP | 0829552 A1 | 3/1998 |
| EP | 1 288 319 A1 | 3/2003 |
| EP | 1380659 A1 | 1/2004 |
| FR | 1594154 A | 6/1970 |
| GB | 615590 A | 1/1949 |
| GB | 885503 A | 12/1961 |
| GB | 974829 A | 11/1964 |
| GB | 1352567 A | 5/1974 |
| GB | 2154315 A | 9/1985 |
| JP | 52135797 | 11/1977 |
| JP | 55050442 | 4/1980 |
| JP | 57152435 | 9/1982 |
| JP | 58104132 | 6/1983 |
| JP | 59028538 | 2/1984 |
| JP | 59205424 | 11/1984 |
| JP | 60234930 | 11/1985 |
| JP | 7070666 | 3/1995 |
| RU | 2105084 | 2/1998 |
| RU | 2112065 | 5/1998 |
| SU | 1589173 | 8/1990 |
| WO | 9827240 | 6/1998 |
| WO | 02052053 | 7/2002 |
| WO | 2004005558 A1 | 1/2004 |
| WO | 2004005559 A1 | 1/2004 |
| WO | 2005095658 A1 | 10/2005 |

OTHER PUBLICATIONS

Proceedings of 4th Int. Symposium on Recycling of Metals & Eng'd Materials, TMS 2000, Kahveci et al., "Refining of a 5XXX Series Aluminum Alloy Scrap by Alcoa Fractional Crystallization Process," p. 979-991(2000).

Hanumanth et al., "Particle Sedimentation During Processing of Liquid Metal-Matrix Composites", Metallurigical Transaction B., vol. 23B, pp. 753-763 (1992).

Isenberg-O'Loughlin, Jo, "Taming the Thunder," Metal Producing. vol. 33. pp. 21-23. Sep. 1994.

L.C. Bartel et al., An Electrical Resistivity Measurement in Molten Basalt During the 1983 Kilauea Eruption, Bull. Volcanol., vol. 46.3, pp. 271-276 (1983).

Perry's Chemical Engineers' Handbook, Seventh Edition, McGraw-Hill, 1997, pp. 18-5 to 18-13.

U.S. Appl. No. 11/492,226—Office Action mailed Sep. 9, 2008, 11 pages.

U.S. Appl. No. 12/304,311—Notice of Allowance mailed Aug. 9, 2010.

U.S. Appl. No. 10/488,042—Notice of Allowance mailed Jun. 2, 2008.

U.S. Appl. No. 10/488,042—Notice of Allowance mailed Mar. 18, 2008.

U.S. Appl. No. 10/488,042—Office action mailed May 11, 2007, 9 pages.

U.S. Appl. No. 10/488,042—Office action mailed Oct. 16, 2007, 5 pages.

U.S. Appl. No. 10/491,278—Office action mailed Dec. 3, 2007, 9 pages.

U.S. Appl. No. 10/491,278—Office action mailed Jun. 26, 2007, 9 pages.

U.S. Appl. No. 10/516,888—Notice of Allowance mailed Jan. 10, 2008.

U.S. Appl. No. 10/516,888—Notice of Allowance mailed Jun. 2, 2008.

U.S. Appl. No. 10/516,888—Office action mailed Feb. 25, 2008, 2 pages.

U.S. Appl. No. 10/516,888—Office action mailed Jan. 13, 2009, 6 pages.

U.S. Appl. No. 10/516,888—Office action mailed Jul. 18, 2007, 11 pages.

U.S. Appl. No. 10/516,888—Office action mailed Sep. 3, 2008, 8 pages.

U.S. Appl. No. 10/516,888—Office action mailed Apr. 20, 2009.

U.S. Appl. No. 10/516,889—Office action mailed Aug. 30, 2007, 14 pages.

U.S. Appl. No. 10/516,889—Notice of Allowance mailed Jul. 10, 2008.

U.S. Appl. No. 10/516,889—Final Rejection mailed May 30, 2008.

U.S. Appl. No. 10/516,889—Final Rejection mailed Jan. 31, 2008.

U.S. Appl. No. 10/577,354—Office Action mailed Nov. 18, 2008, 9 pages.

U.S. Appl. No. 10/598,731—Notice of Allowance mailed Jan. 23, 2009, 7 pages.

U.S. Appl. No. 10/577,354—Notice of Allowance mailed Mar. 5, 2009, 7 pages.

U.S. Appl. No. 10/516,888—Notice of Allowance mailed Oct. 7, 2009.

U.S. Appl. No. 12/304,311—Notice of Allowance mailed Oct. 20, 2010.

* cited by examiner

METHOD AND DEVICE FOR METAL PURIFICATION AND SEPARATION OF PURIFIED METAL FROM METAL MOTHER LIQUID SUCH AS ALUMINIUM

This application is a §371 National Stage Application of International Application No. PCT/EP2007/005974, filed on 5 Jul. 2007, claiming the priority of European Patent Application No. 06014125.6 filed on 7 Jul. 2006.

FIELD OF THE INVENTION

The present invention relates to a method and device for the purification and separation of purified metal from a metal mother liquid comprising at least one foreign element, in particular to a refining method for non-ferrous metals, preferably recycled aluminium scrap. In general the purification of metals can be economically very profitable as it allows scrap metals which may contain different alloying or foreign elements and different amounts of the foreign elements to be processed to regain a standard purity and a higher economic value.

BACKGROUND TO THE INVENTION

As will be appreciated herein below, except as otherwise indicated, alloy designations refer to the Aluminum Association designations in Aluminum Standards and Data and the Registration Records, as published by the Aluminum Association in 2006.

For any description of alloy compositions or preferred alloy compositions, all references to percentages are by weight percent unless otherwise indicated.

In the art various crystallisation methods and apparatuses are used to refine a metal (here used as an abbreviation for metal alloy), which comprises an amount of a foreign element that is unacceptable for the final purposes of the refined metal. Such a foreign element may be present because in the metal made from metal ore, the primary metal, too much of the foreign element is present, or because recycled scrap metals comprises a too high concentration of a foreign element. For example aluminium scrap may contain foreign elements like Fe, Si or Mg at commercially unacceptable levels without being bound to mix it with primary metal comprising little of such an element. In fractional crystallisation metal crystals formed during partial solidification of the mother liquid used as a starting material, have a composition that differs from the composition of the mother liquid itself. The mother liquid may have a hypo-eutectic (see e.g. U.S. Pat. No. 4,273,627) or hyper-eutectic composition.

In the method known from U.S. Pat. No. 4,273,627 a hypo-eutectic molten metal comprising one or more foreign elements is cooled to achieve partial solidification. The molten metal is cooled to just above a eutectic temperature. The crystals that form in the molten metal have a purer composition than that of the molten metal that is used as a starting point. These crystals can then be separated from the remaining molten metal by means of a solid-liquid separation technique. This process however has the drawback that when the initial concentration of foreign elements is high the amount of purified metal obtained is relatively low and the amount of by-product generated is high. This means the fractional crystallisation method may not be economically feasible for e.g. purifying scrap.

Another purification method is by means of separation of foreign elements in which a hyper-eutectic molten metal comprising one or more foreign elements is cooled to achieve partial solidification. The molten metal is cooled to a temperature just above the eutectic temperature. The foreign element(s) solidify to form crystals comprising at least one foreign element and/or pure crystals of a foreign element which can then be separated from the molten metal using a solid-liquid separation technique. A hypo-eutectic molten metal can be made hyper-eutectic by the addition of certain elements as disclosed in U.S. Pat. No. 5,741,348. This method has the disadvantage that the remaining liquid product obtained is not very pure and thus is of relatively low value.

Crystallisation may also be carried out at the eutectic temperature resulting in the simultaneous production of purified metal crystals and crystals comprising a higher concentration of one or more foreign elements compared to the composition of the mother liquid, see e.g. WO-2005/095658-A1. In the method known from WO-2005/095658-A1 the molten metal is cooled to a eutectic temperature in order to simultaneously form purified metal crystals and crystals comprising at least one foreign element. Compared to the starting composition of the molten metal the purified metal crystals are depleted of foreign elements, while the foreign element(s) are concentrated in the other crystals comprising at least one foreign element. Then at least some of the crystals comprising at least one foreign element are separated from the purified metal crystals by using a solid-solid separation technique. This known purification method is beneficial in view of economic feasibility for e.g. purifying scrap such as recycled aluminium, because a relatively pure metal as purified metal crystals can be obtained in a high yield. The solid-solid separation step is exemplified by inter alia a liquid-solid pre-separation step wherein both types of crystals are separated from the molten metal as a mixture and then this mixture is added to molten salt with a specific density between that of the specific densities of the purified metal crystals and the crystals comprising at least one foreign element so that some of the crystals sink into the salt whilst the remainder float on the salt.

Other methods for solid-solid separation described in WO-2005/095658-A1 use centrifugal forces, an electromagnetic field and gas bubbles based floatation.

Alternative pre-separation steps for separating both types of crystals from the total amount of molten metal are also described, such as filtration, centrifugation and a salt layer contacting step using stirring. In this process both types of crystals form simultaneously and settle together in the molten metal thereby forming a mixture of crystals. Although various techniques have been described for separating this mixture into its components, it has appeared that these techniques render the process amongst others complex and laborious to carry out.

A problem associated with almost every crystallisation process is the separation of the purified metal crystals from the impure mother liquid. The mother liquid remains between the crystals produced and in the crystals themselves. This problem may be overcome at least partially by using multiple crystallisation steps and/or counter current washing steps of the mother liquid from the crystals by remolten pure liquid.

A commercially employed method of fractional crystallisation for refining a metal is used in the so-called Yunnan crystalliser. This crystalliser is used for refining a tin alloy by removing Pb from Sn. The molten tin alloy is fed into an elongated container having an open top and an inclined bottom, in said container a screw is slowly rotated. The surface of the molten tin alloy is cooled by spraying water, resulting in the crystallisation of refined tin alloy. These crystals crystallise in the molten tin alloy and are transported to the shallow part of the container. Due to a temperature difference over the length of the container, in the shallow part the crystals are partially molten again, resulting in purer crystals. This mechanism repeats itself several times, and eventually very pure crystals are removed. Molten tin alloy containing Pb is removed at the deep end of the container. In this way, tin alloy containing approximately 10% Pb can be refined into tin alloy containing approximately 0.05% Pb. This method for refining a metal by using the Yunnan crystalliser however cannot be used for all types of metal. One problem is that most metals have a melting point that is far higher than the melting point of the tin alloy for which the Yunnan crystalliser has been build. Because of the higher temperatures, the heat radiation is much higher (the heat radiation increases with the fourth power of the temperature in K) and the heat losses are much higher as well. As a result of this it is much more difficult to control the temperature in the crystalliser. Another problem is that for many metals the temperature difference between the crystallisation temperature of the metal alloy and the crystallisation temperature of the pure metal is very small, in the order of a few K. The Yunnan crystalliser cannot be used for such small differences in crystallisation temperature. A further problem is that the use of mechanical parts such as said screw poses problems in some metals, because the metals normally used for the screw dissolve in these molten metals. An even larger problem is that the crystals formed in the molten metal tend to adhere to the walls of the crystalliser or the screw.

An improved version of the Yunnan process, specifically for the purification of aluminium, uses several stages of suspension crystallisation with multiple separation steps in a settling column arranged between subsequent crystallisation vessels. See e.g. international patent application WO-2005/095658 or WO-2004/005558.

U.S. Pat. No. 4,133,517 discloses a method and device for the continuous purification of an impure metal in a column consisting of a slurry of metal crystals in metal mother liquid. The column has a relatively hot zone at the lower end of the column and a relatively cool upper zone. In the cold zone the temperature is such that liquid and metal crystals coexist. The hot zone has a temperature sufficient to allow for remelting metal crystals. A continuous vertically inverted temperature gradient is applied between the zones, such that the cool zone at the top of the column is chilled resulting in the formation of an amount of metal crystals, usually as a coherent mass. Then incipient melting of said mass occurs in the liquid metal in the cool zone of the column thereby releasing the metal crystals from said mass. The crystals settle due to their higher density into the lower hot zone, wherein melting of the crystals occurs and in this way the hot zone becomes enriched with the pure liquid metal. In normal operation impure feed metal is supplied to the column, while purified liquid metal is withdrawn from the lower hot zone and impurity-enriched metal is withdrawn from the upper cold zone. A disadvantage of this process is that increasing the production rate of the column by either increasing the throughput or increasing the cross-section tends to disturb significantly the stability of the column. The hot remelt of crystals at the lower end of the column has a lower density than the mother liquid. As a result hot plumes of remelt rise in the mother liquid, thereby destroying the counter current flow through the crystal mass, which counter current flow is essential for a proper operation of said purification process.

It is also to be noted here that in general moving mechanical parts in crystallisation processes and high pressure pumping of liquid metal in order to establish a kind of separation are less suited for metal purification on an industrial scale.

Therefore there is an ongoing need in the art for improvements of metal purification processes and devices.

DESCRIPTION OF THE INVENTION

An object of the present invention is to provide an improved method and device for the purification and separation of purified metal crystals from mother liquid using a column, which allows for a more stable operation, in particular when carried out in a continuous mode of operation.

Another object of the present invention is to provide a method and device, which can be used in co-operation with one or more known suspension crystallisation processes, whether hypo-eutectic, eutectic or hyper-eutectic.

Yet another object of the present invention is to provide at least an alternative method and device for the known purification methods and apparatuses.

These and other objectives and further advantages are met or exceeded by the present invention concerning a method for the purification and separation of purified metal crystals from a metal mother liquid having a defined specific density and comprising one or more foreign element(s) which are to be removed, the method comprises the steps of:

(a) providing in a column device a starting material comprising metal crystals and a metal mother liquid comprising at least one foreign element;

(b) applying a temperature difference between a relatively hot zone at or near the upper end of the column device and a relatively cool zone (14) at or near the lower end of the column device;

(c) a separation step wherein at least a part of the metal crystals are separated from the metal mother liquid by rising of the metal crystals to the upper surface of the metal mother liquid; and (d) a further separation step wherein purified liquid metal and/or metal crystals floating at the upper surface of the metal mother liquid is discharged from the column device.

In the method according to the invention a starting material comprising metal crystals and mother liquid thereof is introduced, typically in the lower end of a column device and which is considered to be a cool zone. At the top of the column a hot zone is situated. A temperature difference is applied between the two zones, resulting in a temperature gradient over the length of the column. If desired, the metal crystals may be generated in situ by partial solidification of the metal mother liquid. The metal crystals are caused (or allowed) to rise through the mother liquid, until they get to the upper surface of the mother liquid. During their journey through the mother liquid the metal crystals will be further purified by recrystallisation, the purification degree depending inter alia of the residence time determined by the column length. Metal crystals thus purified and floating on top of the mother liquid can be removed from the upper end of the column.

Due to the hot zone being present at the upper part of the column and the cool zone being present at the lower part of the column and the associated temperature gradient the method according to the invention is inherently stable. Furthermore the present method allows for the processing of starting material comprising metal crystals and metal mother liquid, irrespective of its origin. That is to say the starting material may be derived e.g. from a suspension crystallisation process, whether a hypo-eutectic fractional crystallisation, a eutectic fractional crystallisation or a hyper-eutectic crystallisation.

In the context of this application the term "foreign element" is used to indicate an element whose concentration in the purified metal should be reduced as it decreases the value thereof.

The term "crystals comprising at least one foreign element" as used herein includes intermetallics which are formed when atoms of two or more foreign elements combine in certain proportions to form crystals with a different structure from that of any of the individual foreign elements and also pure crystals of a foreign element.

Elements present in the molten metal but which are not foreign elements, because their presence is not undesirable in the purified product, may be present in the purified metal crystals.

The term "eutectic temperature" refers to a temperature at which at least two solid phases form simultaneously. Eutectic temperature thus refers to the eutectic point for a binary system and to a temperature along the eutectic valley for a ternary, quaternary or higher order system. Phase diagrams of most alloys concerned are readily available from handbooks and basic textbooks, as well as the relevant data of specific densities or calculation methods thereof.

Preferably the hot zone has a temperature, which is sufficient to remelt metal crystals into metal liquid. Then the liquid as purified metal is discharged, e.g. by controlled overflow or using a movable plug in a discharge conduit. In general the withdrawal rate of the purified metal is used as a control parameter for controlling the method according to the invention.

Advantageously the present method is carried out in a continuous operational mode.

In a continuous mode of operation advantageously a by-product material is also separated from the mother liquid and removed from the lower end of the column. This by-product material is impurity enriched compared to the purified metal and to the starting material. In a preferred embodiment, wherein the starting material is derived from eutectic fractional crystallisation the by-product comprises also crystals comprising at least one foreign element. These crystals can be discharged by sedimentation in an intermittent mode.

In a preferred embodiment the metal crystals are caused to rise by addition of a metal purposively increasing the specific density of the metal mother liquid to a value above the specific density of the purified metal, i.e. purified metal crystals and/or purified metal liquid derived from (partially) remelting the purified metal crystals. In this preferred embodiment the density of the mother liquid is modified by the addition of a suitable metal (a high density additive) in an amount sufficient to cause the lighter metal crystals to rise. If the starting material is derived from a crystallisation process at eutectic temperature, it will comprise also metal crystals comprising at least one foreign element (impurity-enriched crystals), which in general have a higher specific density than the purer metal crystals. Then the specific density of the mother liquid will be adjusted purposively in the range delimited by the specific densities of both types of crystals. As the different types of crystals have distinct specific densities the metal mother liquid having a specific density in between will function as a separating means spacing apart one type of crystals from the other and thereby a spatial separation will occur. This allows for a subsequent removal step in essence based on a liquid-solid separation for each of the types of crystals, which is reasonable easy to accomplish.

The addition of metal may be carried out in the column device, e.g. when the starting material is generated in situ in the column device. Advantageously the addition is performed prior to the entrance of the starting material in the column device.

In combination with a eutectic fractional crystallisation process the metal mother liquid is cooled to a eutectic temperature. If the concentration of foreign element(s) in the molten metal mother liquid to be subjected to the present method, is substantially greater than the solid solubility of the foreign element(s) at the eutectic temperature and if the partition coefficient is less than one, the product obtained as purified metal crystals is consistently of relatively high purity and the yield is also relatively high. A product obtained in the form of the purified metal crystals contains substantially less of the foreign element(s) in comparison with the concentration of the foreign element(s) originally present in the mother liquid and the amount of by-product is minimised. The metal crystals comprising at least one foreign element contain substantially more of the foreign element(s) in comparison with the concentration of the foreign element(s) originally present in the mother liquid. The partition coefficient is the ratio of the concentration of the foreign element(s) in the purified metal crystals to the concentration of the foreign element(s) originally present in the molten metal. The partition coefficient may preferably be less than or equal to 0.5 or more preferably less than or equal to 0.25 in order to obtain higher amounts of purer product. This also applies to hypo-eutectic fractional crystallisation.

Examples of partition or distribution coefficients are 0.03 for aluminium containing iron as a foreign element, 0.1 for aluminium containing silicon as a foreign element and 0.93 for aluminium containing manganese as a foreign element. The proceedings of the Fourth International Symposium On Recycling Of Metals And Engineered Materials, TMS 2000, p. 979-991 *"Refining of a 5XXX series aluminium alloy scrap by Alcoa fractional crystallisation process"* by Ali I Kahveci and Ali Unal lists the partition or distribution coefficients for some impurities in aluminium, and incorporated herein by reference.

The metal(s) added easily dissolve in the metal mother liquid. The high density additives are selected advantageously with a view to the further application, processing or use of the purified metal obtainable. The proportions of the high density additives that are to be added in order to adjust the specific density of the metal mother liquid at the required level can be easily calculated and experimentally verified.

In a preferred embodiment the metal increasing the specific density of the molten metal is a metal being substantially insoluble in the purified metal phase. It will be understood that the expression "metal being essentially insoluble in the purified metal crystal phase" includes metals having a low solubility, e.g. less than 0.1%. For example, in the case of purification of aluminium according to the invention such metals include lead, tin and mercury. Lead and tin both have a solubility of less than 0.1% in the purified aluminium crystals. The purified aluminium crystals will float on the molten metal, while the other crystals comprising at least one foreign element will settle. The purified aluminium crystals obtained are suitable for use in machining alloys like AA6082, AA6262, AA2011, and AA2111.

In an alternative preferred embodiment the metal increasing the specific density of the molten metal is a metal being soluble in the purified metal crystal phase. Metals of this kind are very highly soluble in the molten metal. Suitable examples thereof in case of aluminium include in particular copper and zinc. Again the purified aluminium crystals will float on the molten metal. The purified aluminium crystals comprising Cu or Zn are well suited for use in the AA2xxx series alloys, respectively AA7xxx series alloys.

The method of the present invention is particularly suitable for application with non-ferrous metals, more preferably molten aluminium, which comprises one or more one foreign alloying element(s) which are to be removed. Primary aluminium production from aluminium ore is very energy intensive and expensive making recycling more viable. However, using the prior art methods of metal purification it is still often not economically viable to purify aluminium scrap without adding relatively pure primary aluminium to the scrap to effectively dilute the foreign element(s) present. Using the method of the present invention large volumes of aluminium alloy scrap can be cost-effectively purified without requiring the addition of large amounts of pure primary aluminium.

Aluminium casting (foundry) alloys or aluminium brazing alloys comprising a relative high amount of Si, for example in a range of 7 to 15 wt. % can also be purified according to the invention. In this case purified Si crystals (i.e. Al depleted) will rise through the mother liquid and can be separated as an upper product, while aluminium crystals together with intermetallics can be separated as a bottom product. This bottom product may be subjected to further refining treatments.

The present invention can advantageously be used to remove one or more foreign elements such as iron, silicon, copper, lithium, manganese, zinc, and magnesium, which are often present in aluminium alloy scrap in varying quantities.

The present invention is advantageously applied in a continuous process, more preferably in a continuous process wherein the purified metal crystals and crystals comprising at least one foreign element are formed and separated in a continuous manner. By continuously supplying molten metal at or above the eutectic temperature to molten metal which has already been cooled to the eutectic temperature, and in which metal crystals comprising at least one foreign element have already been formed, and maintaining the temperature of the molten metal at the eutectic temperature the metal crystals comprising at least one foreign element are encouraged to grow larger. This is because the metal crystals comprising at least one foreign element already present in the molten metal act as nucleation sites for the crystals comprising at least one foreign element which form out of the molten metal subsequently added. The larger the size of the crystals comprising at least one foreign element the relatively easier they will settle. Preferably the purified metal crystals as well as the crystals comprising at least one foreign element are separated from the mother liquid without a significant amount of molten metal also being discharged. Any mother liquid discharged together with the metal crystals can be returned to the main charge after further solid-liquid separation. As the amount of purified metal crystals is significantly larger than the amount of crystals comprising at least one foreign element, advantageously the purified metal crystals are separated from the mother liquid in a continuous manner, while the crystals comprising at least one foreign element may be separated from the mother liquid in a discontinuous manner, such as periodically. E.g. these latter crystals are collected by sedimentation, after which they are removed in a separation step when a predetermined amount thereof has been obtained.

The purified metal crystals thus separated can be subjected to further purification processes, typically also crystallisation processes, thereby obtaining an additionally purified metal product having significantly reduced amounts of one oe more foreign elements. An example of such a crystallisation process is disclosed in international patent application WO-2004/005559. The resulting product can be used for generic aluminium alloy applications.

Usually the by-product material e.g. crystals comprising at least one foreign element do not need to be subjected to further purification steps. The by-product is used or disposed of as it is. If desired, this by-product material can be further purified by for example crystallisation processes. It should be noted that within the fairly large eutectic temperature range further choices can be made to optimise the size, shape and composition of the by-product crystals.

In another continuous mode of operation the rate of (re) melting the metal crystals is higher than the rate of discharging purified metal, such that liquid purified metal refluxes through the metal crystals. In this embodiment the metal crystals floating on the mother liquid are melted at a rate, which is higher than the withdrawal rate of purified metal. Consequently a part of the liquid purified metal is discharged as a liquid, while another part of the liquid purified flows downwardly to some extent through the floating metal crystals, which will usually form a bed of crystals, thereby further refining said crystals. This allows for the production of a purified metal product, which can generally be used as feedstock for alloys.

In the column there will be a level where the specific density of the metal crystals equals that of the purified metal liquid present at that level such that the driving force for upward movement of the metal crystals due to a difference in specific density will be close to zero. Nevertheless, these metal crystals will further rise above this level due to the upward forces exerted by the packed bed of metal crystals below this level in the column, where the specific density of the metal particles is still lower than that of the metal liquid. Thus the metal crystals will be pushed upwards by the crystal bed.

According to another aspect the invention provides a device for the purification and separation of purified metal from a metal mother liquid comprising at least one foreign element, the device comprising a column defining a separation chamber having an inlet for feeding starting material to be purified comprising metal crystals and metal mother liquid, a top outlet for discharging purified metal, and an outlet for discharging by-product material comprising at least one foreign element, the device also being provided with means for applying a temperature difference between a relatively hot zone at the upper end of the column and a relatively cool zone at the lower end of the column, and with a means to cause rising of the metal crystals through the mother liquid. The device according to the invention comprises a longitudinal column vertically arranged. This column defines a separation chamber wherein metal crystals will rise from the bottom to the top, during which they will be further purified by recrystallisation. The separation chamber has a feed for starting material, typically at the bottom part of the column. At the upper part the column is provided with an outlet and associated discharge means such as a plug or overflow for purified metal. The discharge means will be selected with a view to the nature of the purified metal whether molten liquid or metal crystals. Another outlet for by-product material usually mother liquid enriched in foreign element(s) as impurities optionally as by-product crystals as described above, will usually be connected to the cool zone. This device according to the invention offers the advantages described hereinabove for the method according to the invention.

The means for applying the temperature difference may comprise one or more heating elements, e.g. an external induction heating coil surrounding the hot zone in the upper end of the column and/or cooling means at the cool zone at the lower end of the column. In a preferred embodiment the means for causing the crystals to rise comprises a means for adjusting the specific density of the mother liquid to a value below the specific density of the metal crystals. Preferably such means comprise a feed system of a metal. Such a system supplies a high density additive to the mother liquid in a dosed manner.

In another embodiment the device according to the invention further comprises a crystallisation vessel for a fractional crystallisation process, of which vessel at least one product outlet is connected to the inlet for feeding starting material to be purified of the separation chamber.

The present invention also relates to the use of such a device in refining aluminium alloys.

DESCRIPTION OF THE FIGURES

The invention is further illustrated by reference to the following figures, wherein

In FIG. 1 a column 10 having a constant cross-section over its length is shown. The column 10 defines a separation chamber 11 having an upper hot zone 12 near the top 13 and a lower cool zone 14 near a bottom part 16. The bottom part 16 is connected to an inlet 18 for starting material and is provided at the opposite side wall with a waste outlet 20 for discharging a waste flow comprising impurities. At the top an outlet 22 for purified metal is provided. Surrounding the hot zone 12 an external heating element 24 is provided for remelting metal crystals, which are indicated as solid circles 26.

Figure 1:
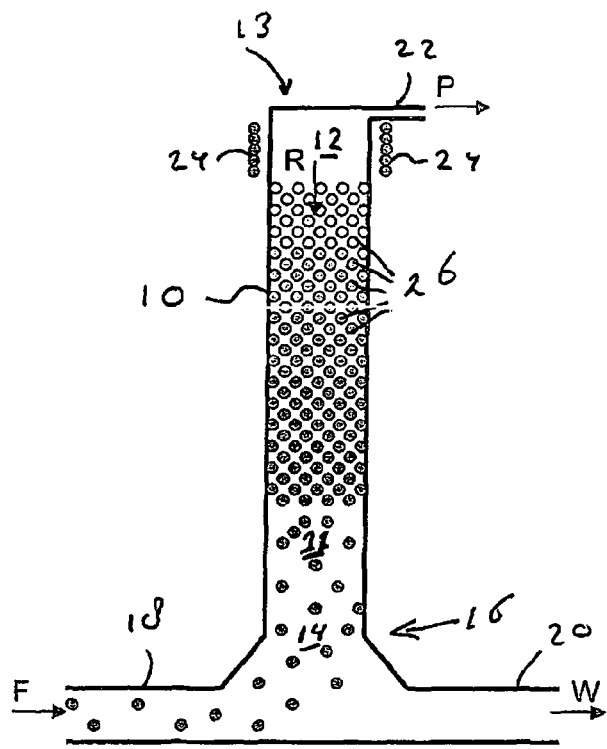
FIG. 1 is a schematic representation of an embodiment of a device according to the invention.

In operation a feed F of starting material comprising metal crystals and mother liquid and in this case already a high specific density additive, is fed to the cool zone 14 at the bottom 16 of the column 10 via the inlet 18. Due to the specific density difference between the mother liquid and the crystals 26, the latter will start to rise in the separation chamber 11, forming a bed of metal crystals. The crystals at the top of this bed are melted by the heating element 24 into a purified metal product P. This liquid purified product P is removed via outlet 22, e.g. using an overflow (not shown). In reflux mode, only a part of the product P is withdrawn from the column 10. Then another part R of the product will flow in counter current flow through the bed of crystals causing further purification of the crystals in the bed by partial recrystallisation and washing away entrained mother liquid and/or impurities.

Figure 2:
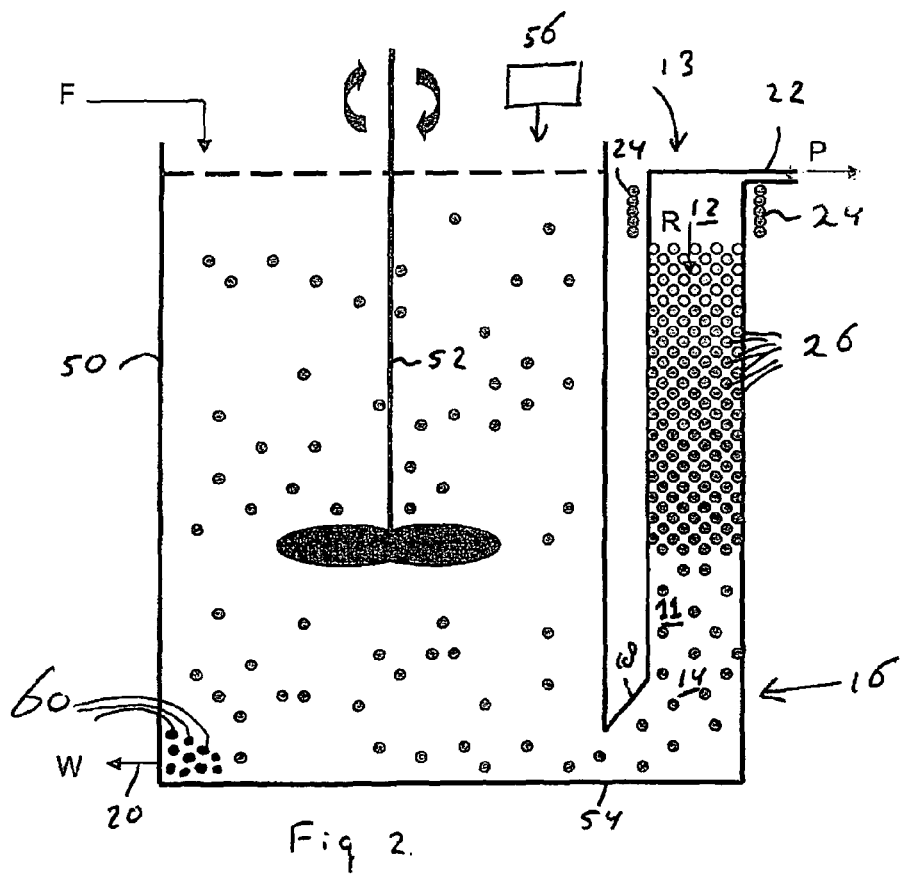
FIG. 2 shows another embodiment of a device according to the invention.

FIG. 2 shows an embodiment wherein a column 10 as described with reference to FIG. 1 is arranged in fluid communication with a crystalliser vessel 50. More specifically the crystalliser vessel 50 equipped with a mechanical stirrer 52 is provided with a bottom drain 54 connected to the inlet 18 for starting material. In this case the column 10 has no separate outlet for the by-product, but the vessel 50 has. A feed means 56 for dosing high density additive is situated above the vessel 50.

In operation a feed of (molten) metal F is fed to the crystalliser vessel 50, which is cooled by cooling means (not shown) such that continuously metal crystals 26 are formed. Due to the withdrawal of purified product P at the top of the column 10 and the mechanical stirring a continuous steady flow of crystals 26 will occur from the vessel 50 into the separation chamber 11 via drain 54 and inlet 18. In this way a steady bed of crystals 26 is formed in the separation chamber, growing from beneath and decreasing from the top by remelting. Again part of the liquid purified product P is discharged continuously, while under reflux operation another part R of the liquid will flow downwardly in counter current flow through the bed of crystals. A stream of by-product material W is discharged from the vessel 50 to prevent excessive buildup of foreign elements.

In the case of eutectic fractional crystallisation and adjustment of the specific density of the mother liquid in the range delimited by the specific densities of on the one hand the metal crystals 26 and on the other hand that of crystals 60 comprising one or more foreign elements (intermetallic solids) the latter crystals 60 collect at the bottom of the vessel 50 and are instantaneously separated from the purified metal crystals 26.

The invention will now be illustrated with reference to non-limiting embodiments according to the invention.

EXAMPLES

Example 1

This qualitative example relates to a mode of operation of the method according to the present invention, wherein a high density additive with low solubility in the purified aluminium crystal phase such as lead or tin is added. These metals increase the specific density to above the specific density of the aluminium crystals. The aluminium crystals formed in the mother liquid have a reduced content of eutectic elements, such as iron and silicon, as well as a very low concentration of high specific density additive.

A refining experiment was carried out with a starting material based on an aluminium alloy comprising 1 wt. % of each of Fe, Mn, and Si. This is a composition near the eutectic one. The starting material contained a suspension (30% solids) of aluminium crystals in mother liquid. The specific density of this aluminium mother liquid is about 2.4 g/cm$^3$. Tin was added in an amount within the range of 7.5 to 25 wt. %, thereby raising the specific density within the range of 2.6 to 2.9 g/cm$^3$. The specific density of the purified aluminium crystals is about 2.6 g/cm$^3$. This difference in specific density was sufficient for a good separation and a stable operation of the column.

The starting material was fed to the column, where the light aluminium crystals quickly raised to the top and formed a packed bed of crystals. At the top the metal crystals were remolten. As a result the purified metal liquid at the top of the column became purer. This purified metal liquid was withdrawn at the top of the column as product. The withdrawal rate was equal to the remelting rate. The product was purified from the elements Fe, Mn, and Si. The product was suitable for use as a machining alloy, such as AA6081, AA6262, AA2111, or AA2011.

In a similar experiment 7.5 to 25 wt. % lead was added to raise the specific density of the aluminium mother liquid within the range of 2.6 to 3.0 g/cm$^3$. Similar results were obtained.

Example 2

This example shows a continuous mode of operation of the method according to the invention as in Example 1, except that now elements soluble in the purified metal crystals were used.

Using the same starting material as in Example 1, 7.5 to 25 wt. % copper was added, thereby increasing the specific density of the mother liquid to about 2.6 to 3.2 g/cm$^3$. The density of the aluminium crystals containing copper increased slightly to about 2.6-2.7 g/cm$^3$. The product obtained was useful in AA2xxx-series alloys.

In the case of the addition of zinc a suitable working range is 15-25 wt. %, thereby increasing the specific density of the aluminium mother liquid to 2.7-3.0 wt. % and that of the aluminium crystals to 2.7-2.8 g/cm$^3$. The product obtained can be used in AA7xxx-series alloys.

Example 3

This example shows a reflux mode of operation. The conditions were the same as in Examples 1 and 2, except that the remelting rate was set higher than the withdrawal rate of the product, thereby generating a reflux of purified metal liquid. In this case the upward force of the crystal bed due to the particle buoyancy causes part of the purified metal liquid to flow downwards in counter current flow through the crystal bed in the column. This counter current flow washes entrained mother liquid away and enhances the purification efficiency. The increase in purification is dependent from the contact time of the purified metal liquid with the crystal bed. In other words, when the column is of sufficient length such that the reflux flow of purified metal liquid from the top is in contact with the crystal bed over a sufficiently long distance for a sufficiently long time, local chemical equilibrium between liquid and crystals is obtained over the height of the column. Thereby the concentration of eutectic elements (including any high specific density additives) in the aluminium crystals is reduced further. As a result the products obtained were sufficiently pure enough for general use in aluminium alloys.

Having now fully described the invention, it will be apparent to one of ordinary skill in the art that many changes and modifications can be made without departing from the spirit or scope of the invention as herein described.

The invention claimed is:

1. Method for the purification and separation of purified metal from a metal mother liquid having a specific density and comprising one or more foreign element(s), the method comprising the steps of:
    providing in a column device a starting material comprising metal crystals and a metal mother liquid comprising at least one foreign element;
    applying a temperature difference between a relatively hot zone at the upper end of the column and a relatively cool zone at the lower end of the column;
    a separation step wherein at least a part of the metal crystals are separated from the metal mother liquid by rising of the metal crystals to the upper surface of the metal mother liquid; and
    a further separation step wherein purified liquid metal or metal crystals floating at the upper surface of the metal mother liquid is discharged from the column device,
    wherein metal crystals rise from the metal mother liquid by adjusting the specific density of the metal mother liquid to a value of more than the specific density of the purified liquid metal and of more than the metal crystals and wherein the specific density of the metal mother liquid is adjusted to said value by the addition of a metal.

2. Method according to claim 1, wherein the metal increasing the specific density of the metal mother liquid is a metal being substantially insoluble in the metal crystal phase.

3. Method according to claim 2, wherein the metal mother liquid is aluminium and the metal being substantially insoluble in the aluminium crystal phase is selected from the group comprising Sn, Pb, and Hg.

4. Method according to claim 1, wherein the metal increasing the specific density of the metal mother liquid is a metal being soluble in the metal crystal phase.

5. Method according to claim 4, wherein the metal mother liquid is aluminium and the metal being soluble in the phase of the purified metal crystals is selected from the group of Cu, and Zn.

6. Method according to claim 1, wherein the foreign element(s) comprise(s) one or more of the group of Cu, Fe, Li, Mg, Mn, Si, and Zn.

7. Method according to claim 1, wherein the starting material is derived from a suspension crystallisation process.

8. Method according to claim 7, wherein the suspension crystallisation process occurs in a crystallisation vessel of which an outlet is connected to an inlet for feeding the starting material to a separation chamber having the inlet for feeding starting material to be purified comprising the metal crystals and the metal mother liquid.

9. Method according to claim 1, wherein a by-product material is separated from the metal mother liquid in a separation step at the lower end of the column device.

10. Method according to claim 9, wherein a by-product material comprising crystals comprising at least one foreign element is separated in a further separation step by means of sedimentation.

11. Method according to claim 1, wherein the metal crystals floating on top of the metal mother liquid are melted to a metal liquid which is discharged subsequently.

12. Method according to claim 1, wherein the method is carried out in a continuous operation.

13. Method according to claim 11, wherein the rate of melting metal crystals is higher than the rate of discharging purified metal, such that liquid purified refluxes through the metal crystals.

14. Method according to claim 1, wherein the column defines a separation chamber having an inlet for feeding starting material to be purified comprising the metal crystals and the metal mother liquid,
    a top outlet for discharging the purified metal, and
    an outlet for discharging by-product material comprising at least one foreign element.

15. Method according to claim 14, wherein the adjusting of the specific density of the metal mother liquid comprises adding a high density metal through a feed means to the metal mother liquid.

16. Method for the purification and separation of purified metal from a metal mother liquid having a specific density and comprising one or more foreign element(s), the method comprising the steps of:
    providing in a column device a starting material comprising metal crystals and a metal mother liquid comprising at least one foreign element;
    applying a temperature difference between a relatively hot zone at the upper end of the column and a relatively cool zone at the lower end of the column;
    a separation step wherein at least a part of the metal crystals are separated from the metal mother liquid by rising of the metal crystals to the upper surface of the metal mother liquid; and
    a further separation step wherein purified liquid metal or metal crystals floating at the upper surface of the metal mother liquid is discharged from the column device,
    wherein a by-product material is separated from the metal mother liquid in a separation step at the lower end of the column device.

17. Method according to claim 16, wherein a by-product material comprising crystals comprising at least one foreign element is separated in a further separation step by means of sedimentation.

18. Method for the purification and separation of purified metal from a metal mother liquid having a specific density and comprising one or more foreign element(s), the method comprising the steps of:
    providing in a column device a starting material comprising metal crystals and a metal mother liquid comprising at least one foreign element;

applying a temperature difference between a relatively hot zone at the upper end of the column and a relatively cool zone at the lower end of the column;

a separation step wherein at least a part of the metal crystals are separated from the metal mother liquid by rising of the metal crystals to the upper surface of the metal mother liquid; and a further separation step wherein purified liquid metal or metal crystals floating at the upper surface of the metal mother liquid is discharged from the column device, wherein the metal crystals floating on top of the metal mother liquid are melted to a metal liquid which is discharged subsequently.

19. Method according to claim 18, wherein the rate of melting metal crystals is higher than the rate of discharging purified metal, such that liquid purified refluxes through the metal crystals.

20. Method according to claim 18, wherein the method is carried out in a continuous operation.

* * * * *